United States Patent
Robertson, Jr. et al.

(10) Patent No.: US 12,377,790 B2
(45) Date of Patent: Aug. 5, 2025

(54) SENSOR ASSEMBLY AND METHOD OF INSTALLING TO A VEHICLE

(71) Applicant: Ford Global Technologies, LLC, Dearborn, MI (US)

(72) Inventors: Michael Robertson, Jr., Garden City, MI (US); Tyler D. Hamilton, Farmington, MI (US); Kunal Chaudhari, Westland, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 649 days.

(21) Appl. No.: 17/752,901

(22) Filed: May 25, 2022

(65) Prior Publication Data

US 2023/0406219 A1 Dec. 21, 2023

(51) Int. Cl.
*B60R 11/00* (2006.01)
*F16B 5/02* (2006.01)

(52) U.S. Cl.
CPC ............ *B60R 11/00* (2013.01); *F16B 5/0233* (2013.01); *F16B 5/0241* (2013.01)

(58) Field of Classification Search
CPC .............................. F16B 39/025; F16B 43/004
See application file for complete search history.

(56) References Cited

U.S. PATENT DOCUMENTS

| | | | |
|---|---|---|---|
| 1,685,120 A * | 9/1928 | Carns | F16B 39/108 411/934 |
| 6,974,275 B2 * | 12/2005 | Nago | F16D 65/12 188/26 |
| 6,976,816 B2 * | 12/2005 | Slesinski | F16C 25/06 411/122 |
| 7,346,994 B2 | 3/2008 | Shevela | |
| 9,352,651 B2 | 3/2016 | Formey | |
| 9,359,012 B2 * | 6/2016 | Yao | F16B 37/042 |
| 9,374,900 B2 * | 6/2016 | Huffman | H05K 1/144 |
| 9,580,023 B2 | 2/2017 | Bruss et al. | |
| 9,654,692 B2 | 5/2017 | Mohr | |
| 11,131,740 B2 | 9/2021 | Houk et al. | |
| 11,499,579 B2 * | 11/2022 | Yoen | F16B 5/02 |
| 12,173,745 B2 * | 12/2024 | Chalvet | F16B 5/025 |
| 2020/0346589 A1 | 11/2020 | Griimnwald et al. | |

FOREIGN PATENT DOCUMENTS

CN 213270581 U 5/2021

* cited by examiner

Primary Examiner — Matthew R McMahon
(74) Attorney, Agent, or Firm — Frank A. MacKenzie; Brooks Kushman P.C.

(57) ABSTRACT

An assembly for mounting a sensor to a vehicle includes a base, a sensor bracket, and a tolerance compensator between the base and the sensor bracket. The tolerance compensator is threadedly coupled to the base and releasably engaged with the sensor bracket in an assembled position. The assembly includes a washer including a hub fixed relative to the base and a plurality of tabs arranged circumferentially around the hub and extending radially relative to the hub. One of the tabs is moveable into engagement with the tolerance compensator in the assembled position.

18 Claims, 7 Drawing Sheets

SENSOR ASSEMBLY AND METHOD OF INSTALLING TO A VEHICLE

BACKGROUND

Vehicles, such as autonomous or semi-autonomous vehicles, typically include a variety of sensors. The sensors may be positioned at various positions around the vehicle to sense the external world for use in the autonomous or semi-autonomous operation of the vehicle. Positioning and alignment requirements of these sensors affects the operation of the sensor and the data collected by the sensors. Thus, the proper position and alignment of each sensor must be accomplished at the time of assembly to the vehicle and must be maintained during operation, use, and repair of the vehicle.

DETAILED DESCRIPTION

Figure 1:
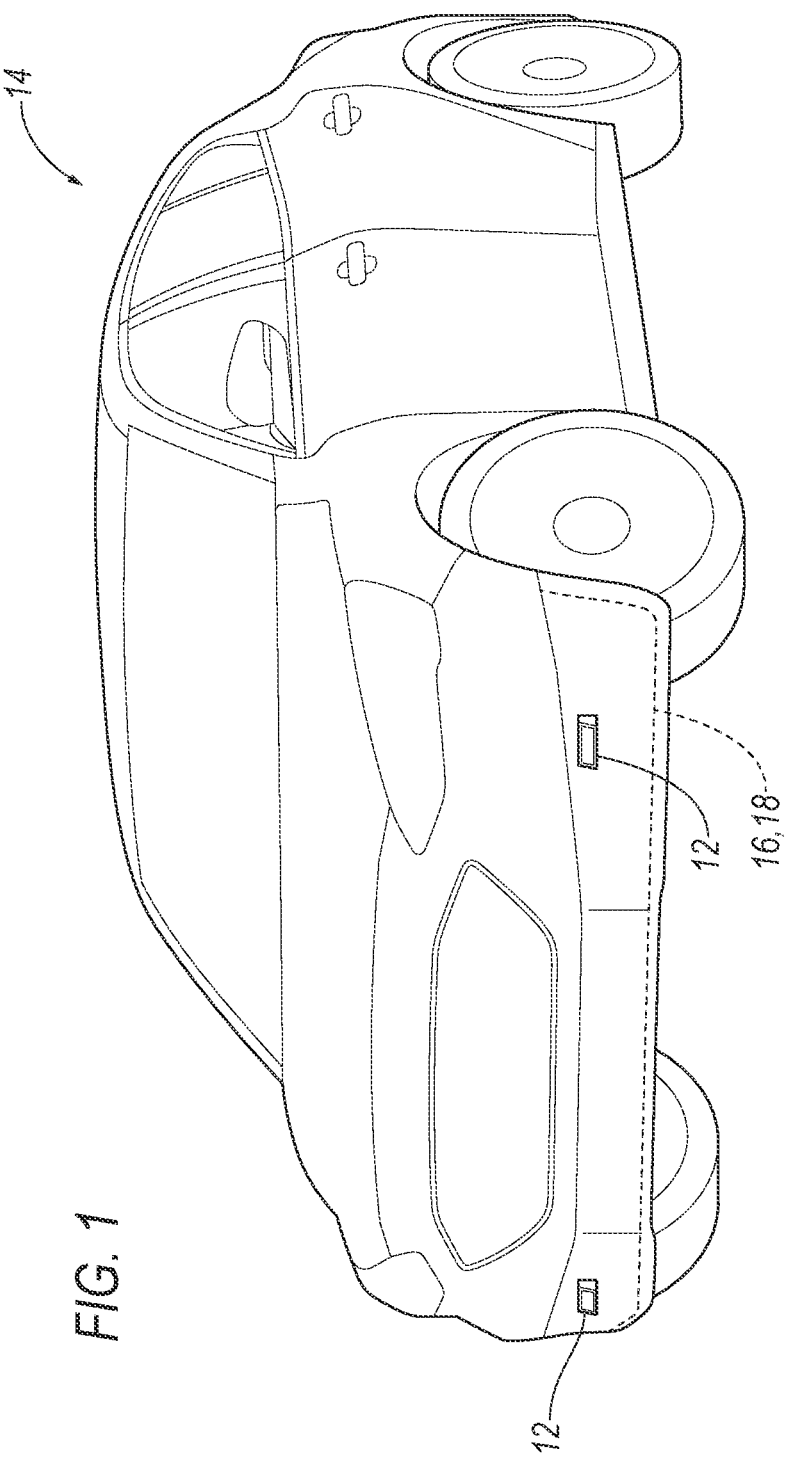
FIG. 1 is a perspective view of a vehicle including a plurality of sensor assemblies.

An assembly includes a base, a sensor bracket and, a tolerance compensator between the base and the sensor bracket. The tolerance compensator is threadedly coupled to the base and releasably engaged with the sensor bracket in an assembled position.

A washer includes a hub fixed relative to the base and a plurality of tabs arranged circumferentially around the hub and extending radially relative to the hub. One of the tabs are moveable into engagement with the tolerance compensator in the assembled position. The washer may include an aperture and the base may include an aperture that is coaxial with the aperture of the washer.

A connector may be coaxial with the aperture of the washer, in such an example, the connector may be fixed relative to the base and threadedly engaged with the tolerance compensator. The sensor bracket may include an aperture coaxial with the aperture of the washer and the tolerance compensator may include a bore coaxial with the aperture of the washer. A fastener may extend through the aperture of the sensor bracket and into the bore of the tolerance compensator. A rivet nut may extend through the aperture of the washer and the aperture of the base, in such an example, the rivet nut may be riveted to the base and threadedly engaged with the tolerance compensator. The base may include a front side and a back side, in such an example, the aperture may extend through the front side and the back side. The rivet nut may include a bulb on the back side and a radial flange on the front side, the washer may be pinched between the radial flange and the front side. The front side, the hub of the washer, and the radial flange may be in parallel planes between the front side and the radial flange.

A connector may be fixed relative to the base and threadedly engaged with the tolerance compensator. The washer may be between the base and the connector.

The fastener may extend through the aperture of the sensor bracket and into the bore of the tolerance compensator. The fastener may be threadedly engaged with the bore of the tolerance compensator.

One of the tabs that may be moveable into engagement with the tolerance compensator in the assembled position may be moveable independently of the other ones of the tabs.

One of the tabs that may be moveable into engagement with the tolerance compensator in the assembled position may be elongated transverse to the hub in the assembled position and the other ones of the tabs may be elongated radially from the hub in the assembled position.

One of the tabs is moveable into engagement with the sensor bracket in the assembled position.

A method of installing a sensor bracket to a base, the method comprising: threadedly coupling a tolerance compensator to the base; releasably engaging the sensor bracket to the tolerance compensator; fixing a hub of a washer relative to the base, the washer including a plurality of tabs arranged circumferentially around the hub and extending radially relative to the hub; and after threadedly coupling the tolerance compensator to the base, moving one of the tabs into engagement with the tolerance compensator.

Releasably engaging the sensor bracket to the tolerance compensator may include inserting a threaded fastener through an aperture of the sensor bracket and threadedly engaging a threaded bore of the tolerance compensator. The fastener may engage the bore of the tolerance compensator such that the fastener is free of direct engagement with the base.

Coaxially aligning an aperture in the hub, an aperture of the base, and an aperture of the sensor bracket.

Inserting a rivet nut into an aperture in the hub of the washer and into an aperture of the base may include deforming the rivet nut on a back side of the base. Threadedly coupling the tolerance compensator to the base may include threadedly engaging threads of the tolerance compensator with threads of the rivet nut.

Moving the one of the tabs of the washer into engagement with the tolerance compensator may include moving the one of the tabs into engagement with the sensor bracket.

Figure 4:
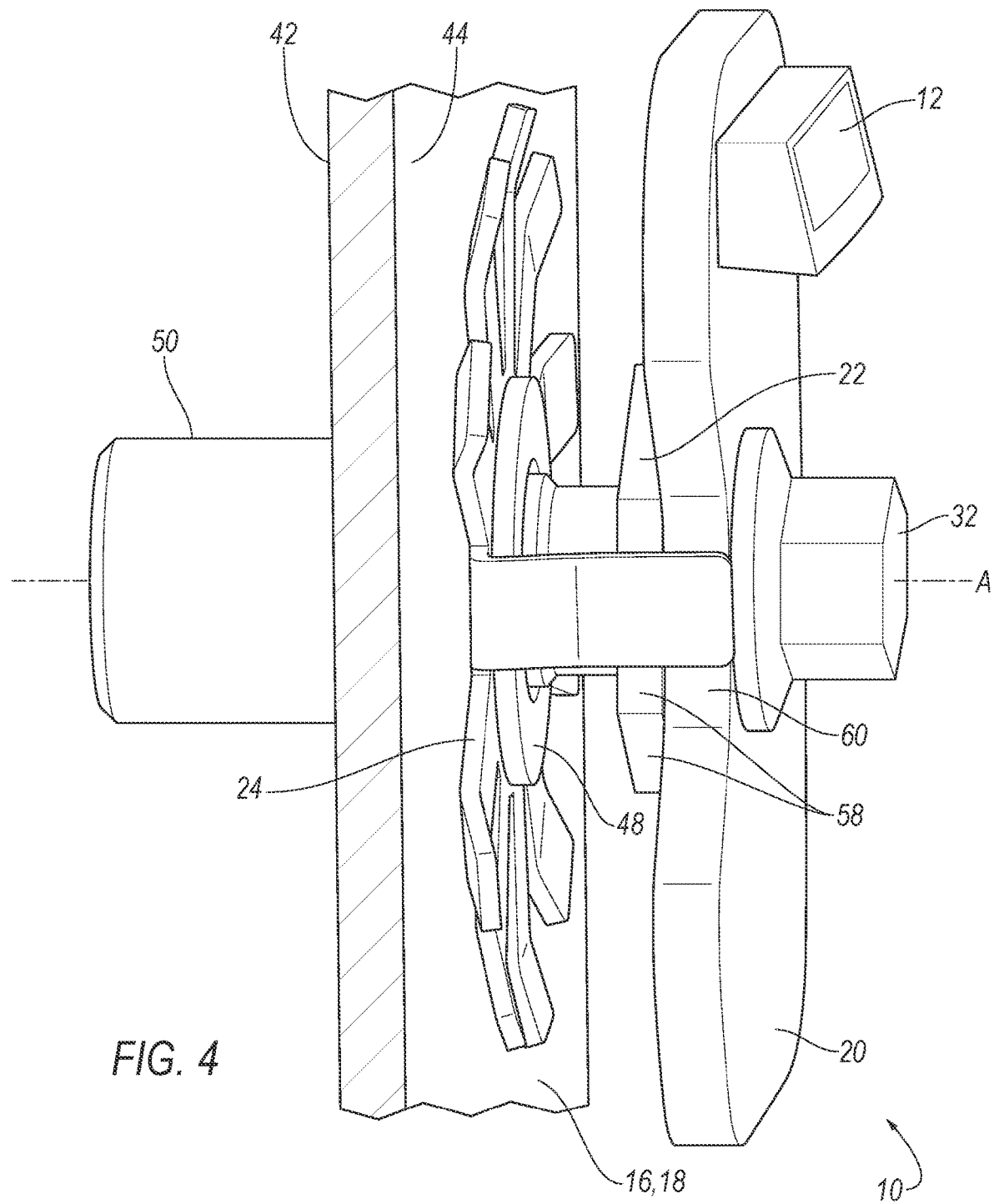
FIG. 4 is a perspective view of the sensor assembly in an assembled position.
Figure 5:
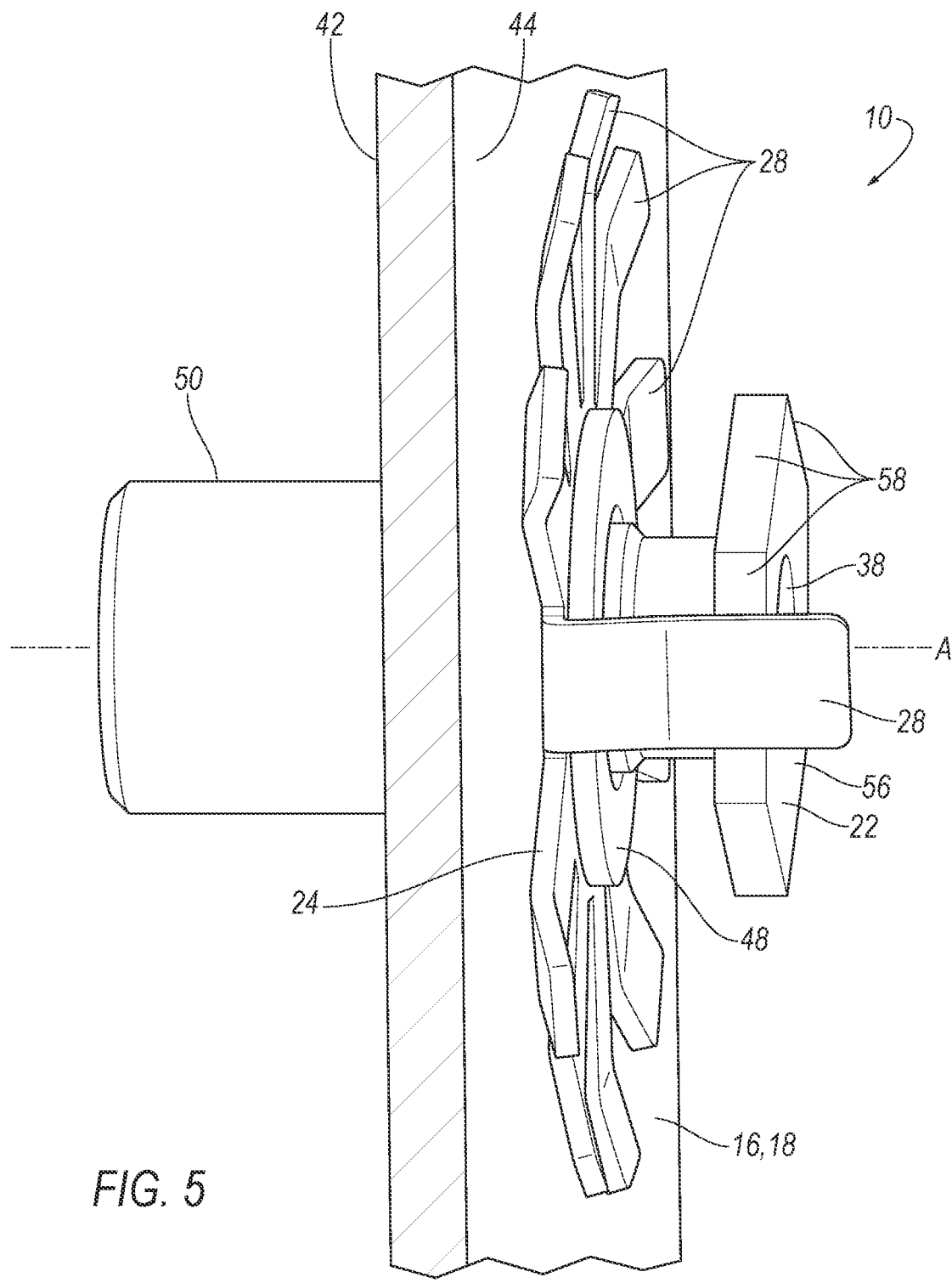
FIG. 5 is a perspective view of the sensor assembly with a sensor and sensor bracket removed.
Figure 6:
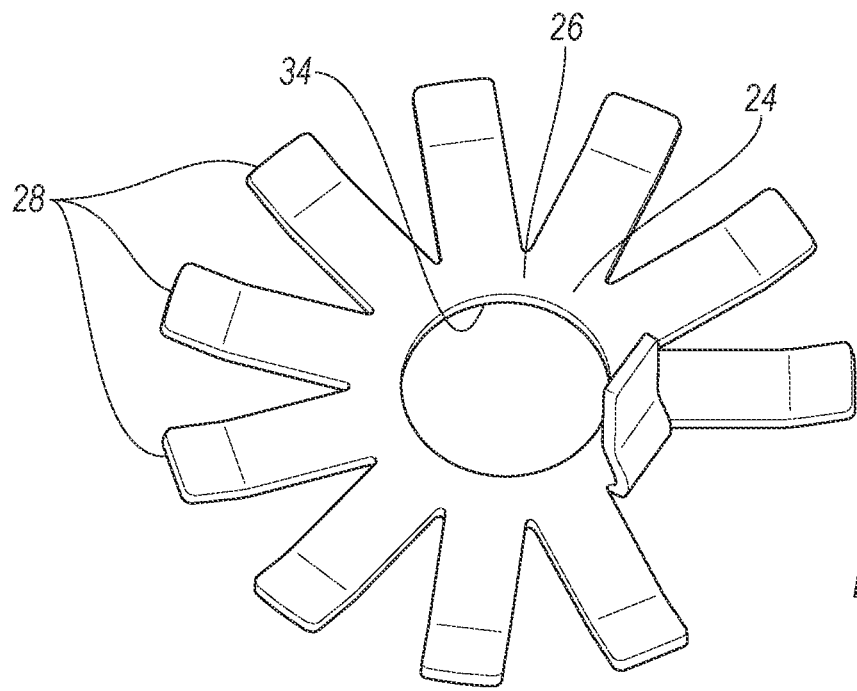
FIG. 6 is an example of a washer of the sensor assembly.

With reference to the figures, wherein like numerals indicate like parts throughout the several views, an assembly 10 for mounting a sensor 12 to a vehicle 14 is generally shown. The assembly 10 includes a base 16 (e.g., a vehicle body 18 of the vehicle 14), a sensor bracket 20, and a tolerance compensator 22 between the base 16 and the sensor bracket 20. The tolerance compensator 22 is threadedly coupled to the base 16 and releasably engaged with the sensor bracket 20 in an assembled position (FIGS. 4-5). The assembly 10 includes a washer 24 including a hub 26 fixed relative to the base 16 and a plurality of tabs 28 arranged circumferentially around the hub 26 and extending radially relative to the hub 26. One of the tabs 28 is moveable into engagement with the tolerance compensator 22 in the assembled position.

The assembled position of the assembly 10 is shown in FIGS. 4-5. In the assembled position, the washer 24 is positioned to engage the tolerance compensator 22 to prevent rotation of the tolerance compensator 22 in the assembled position. This locks the tolerance compensator 22 in place relative to the base 16 which allows for the sensor bracket 20 to be removed from the tolerance compensator 22 and the base 16 (e.g., for vehicle service) and reassembled to the tolerance compensator 22 and the base 16 in the same position relative to the base 16 as the original assembled position. Specifically, one of the tabs 28 of the washer 24 may be moved to engage the tolerance compensator 22 to prevent rotation of the tolerance compensator 22 relative to the base 16. As an example, after assembly 10 of the sensor bracket 20 to the base 16, the sensor 12 may be calibrated in that assembled position. The tab 28 is engaged with the tolerance compensator 22 to lock the tolerance compensator 22 in place relative to the base 16. This allows for removal and re-assembly 10 of the sensor bracket 20 to the same position at which calibration was made. In other words, this allows the sensor 12 to be removed and reassembled without movement of the tolerance compensator 22 and readjustment or recalibration of the sensor 12. For example, this allows for removal of the sensor bracket 20 during vehicle service and re-assembly 10 in the same position relative to the base 16 to avoid recalibrating the sensor 12. In addition, the engagement of the tab 28 with the tolerance compensator 22 prevents the tolerance compensator 22 from moving out of position over time while the vehicle 14 is in use.

Figure 8:
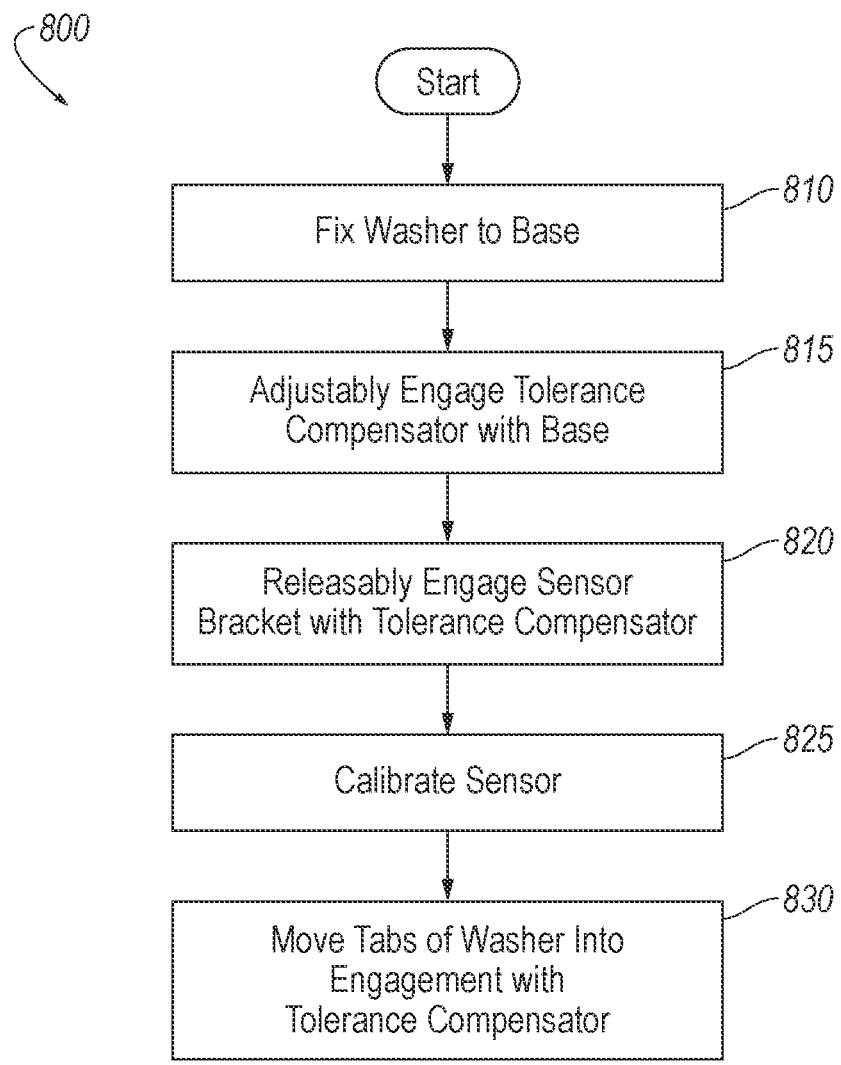
FIG. 8 is a diagram of method of installing the sensor assembly to the vehicle.

A method 800 of installing a sensor bracket 20 to a base 16 is shown in FIG. 8. The method 800 includes threadedly coupling the tolerance compensator 22 to the base 16 and releasably engaging the sensor bracket 20 to the tolerance compensator 22. The method 800 includes fixing the hub 26 of the washer 24 relative to the base 16. The method 800 includes, after threadedly coupling the tolerance compensator 22 to the base 16 and releasably engaging the sensor bracket 20 to the tolerance compensator 22, moving one of the tabs 28 into engagement with the tolerance compensator 22. By moving one of the tabs 28 into engagement with the tolerance compensator 22, the method 800 locks the position of the tolerance compensator 22 relative to the base 16 to allow the sensor bracket 20 to be removed and re-assembled in the same position relative to the base 16. Specifically, the sensor bracket 20 may be removed, for example during vehicle service, and re-assembled in the same position relative to the base 16 to avoid recalibrating the sensor 12.

The vehicle 14 may be any suitable type of automobile, e.g., a passenger or commercial automobile such as a sedan, a coupe, a truck, a sport utility, a crossover, a van, a minivan, a taxi, a bus, etc. The vehicle 14, for example, may be autonomous. In other words, the vehicle 14 may be autonomously operated such that the vehicle 14 may be driven without constant attention from the driver, i.e., the vehicle 14 may be self-driving without human input.

With reference to FIG. 1, the vehicle 14 includes a vehicle body 18 and may include a vehicle frame (not numbered). The vehicle body 18 may be of a unibody construction, a body-on-frame construction, or any suitable construction. In the unibody construction, the vehicle body 18 serves as the vehicle frame and the vehicle body 18 (includes the rockers, pillars, roof rails, etc.) is unitary, i.e., a continuous one-piece unit. As another example, in body-on-frame construction (also referred to as a cab-on-frame construction), the vehicle body 18 and the vehicle frame are separate components, i.e., are modular, and the vehicle body 18 is supported on and affixed to the vehicle frame. Alternatively, the vehicle body 18 and/or vehicle frame may have any suitable construction. The vehicle body 18 and/or vehicle frame may be of any suitable material, for example, steel, aluminum, etc. As set forth above, the assembly 10 for mounting the sensor 12 to the vehicle 14 includes a base 16. The base 16, as an example, may be the vehicle body 18 and/or the vehicle frame.

The vehicle 14 includes the sensor 12. Specifically, as set forth above, the assembly 10 includes the sensor 12. The vehicle 14 may include one or more of the assemblies 10 with each assembly 10 including at least one sensor 12. In examples including more than one assembly 10, the sensors 12 of the different assemblies 10 may be of the same type or different types. The sensor 12 may, for example, collect data for autonomous or semi-autonomous operation of the vehicle 14. One or more of the sensors 12 may detect internal states of the vehicle 14, for example, wheel speed, wheel orientation, and engine and transmission variables. One or more of the sensors 12 may detect the position or orientation of the vehicle 14, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. One or more of the sensors 12 may detect the external world, for example, radar sensors, scanning laser range finders, light detection and ranging (LIDAR) devices, and image processing sensors 12 such as cameras. A LIDAR device detects distances to objects by emitting laser pulses and measuring the time of flight for the pulse to travel to the object and back. One or more of the sensors 12 may be communications devices, for example, vehicle-to-infrastructure (V2I) or vehicle-to-vehicle (V2V) devices.

Figure 2:
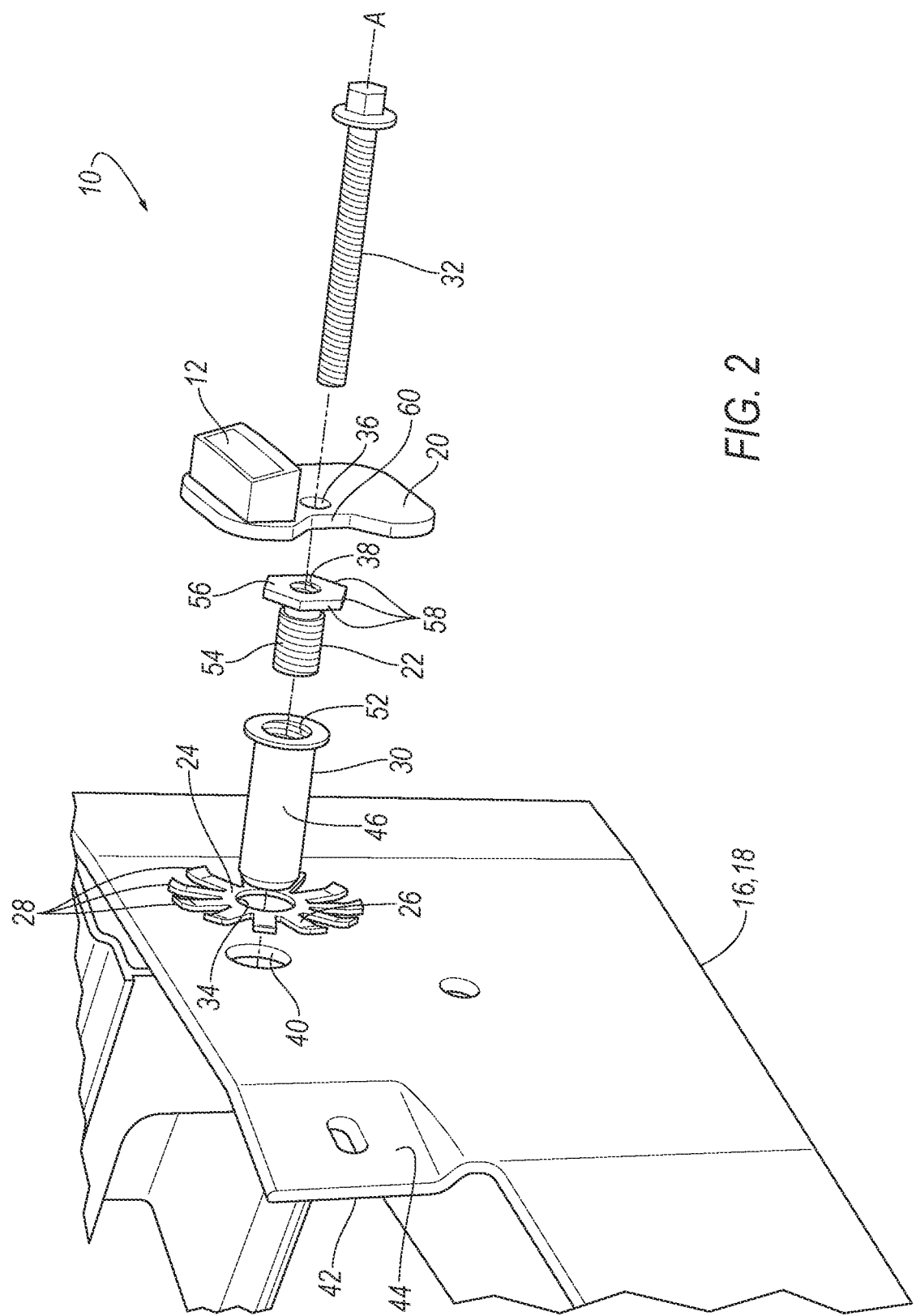
FIG. 2 is an exploded view of one of the sensor assemblies.

With reference to FIG. 2, as set forth above, the assembly 10 includes the base 16, the washer 24, the tolerance compensator 22, and the sensor bracket 20. As an example, as shown in the example in the figures, the assembly 10 may include a connector 30 that connects the tolerance compensator 22 and the washer 24 to the base 16. In such an example, the tolerance compensator 22 may be connected to the connector 30, e.g., by threaded connection, to connect the tolerance compensator 22 to the base 16. As described further below, the tolerance compensator 22 may be linearly adjustable relative to the connector 30 (e.g., with the use of threaded engagement) to adjust the position of the tolerance compensator 22 and the sensor bracket 20 relative to the base 16, as described further below. The sensor bracket 20 is connected to the tolerance compensator 22. For example, as shown in the example shown in the figures, the assembly 10 may include a fastener 32 that connects the sensor bracket 20 to the tolerance compensator 22.

Figure 3:
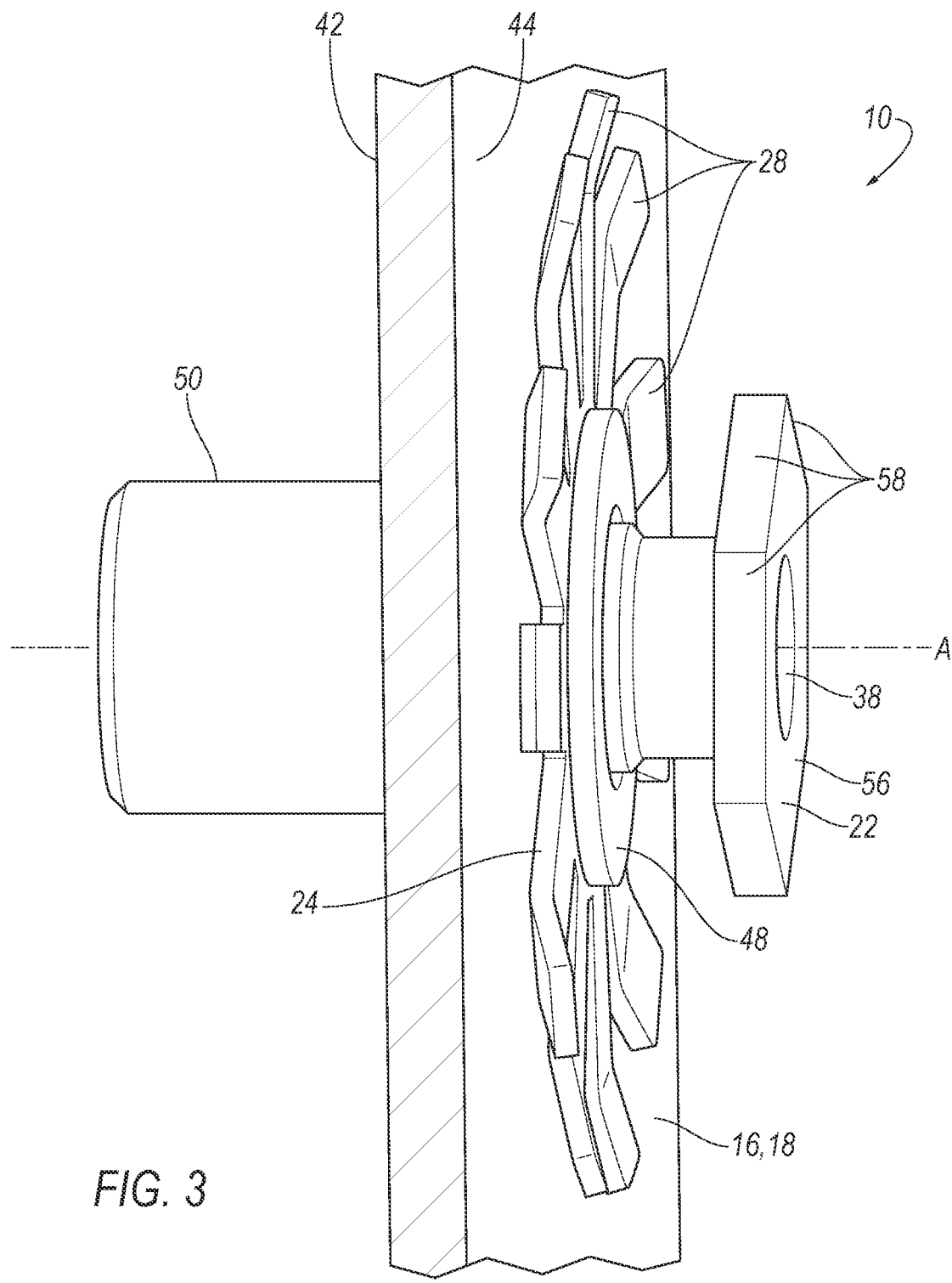
FIG. 3 is a perspective view of a portion of the sensor assembly assembled to the vehicle.

With reference to FIGS. 2-4, the tolerance compensator 22 is between the base 16, e.g., the vehicle body 18 and/or vehicle frame, and the sensor bracket 20. The tolerance compensator 22 spaces the sensor bracket 20 and the sensor 12 from the base 16. The tolerance compensator 22 is adjustable relative to the base 16 to adjust the position of the sensor bracket 20 relative to the base 16. The position of the sensor bracket 20 and the sensor 12 relative to the base 16 may be adjusted during initial assembly 10 of the sensor bracket 20 and the sensor 12 to the base 16. This positioning may be used to calibrate the sensor 12 and/or the sensor 12 may be calibrated after the position of the sensor bracket 20 and the sensor 12 are locked relative to the base 16. Specifically, as described further below, one of the tabs 28 of the washer 24 may be moved, e.g., bent, to lock the position of the tolerance compensator 22 and the sensor bracket 20 relative to the base 16. Accordingly, the tolerance compensator 22 is fixed in position relative to the base 16 allowing the sensor bracket 20 to be removed from the base 16 and subsequently reassembled to the base 16 in the same position relative to the base 16.

With reference to FIG. 2, the washer 24 and the tolerance compensator 22 may be coaxial. In other words, the washer 24 and the tolerance compensator 22 share a common central axis A. Specifically, the tolerance compensator 22 may be elongated along the axis A and the washer 24 may extend radially from the axis A.

With reference to FIGS. 3-5, the washer 24 is fixed relative to the base 16. Specifically, the washer 24 is fixed relative to the base 16 along the axis A. As set forth above, the assembly 10 may include the connector 30 that connects the tolerance compensator 22 to the base 16 and/or the fastener 32 that connects the sensor bracket 20 to the tolerance compensator 22. In such examples, the connector 30 and/or the fastener 32 may be coaxial with the washer 24 and the tolerance compensator 22. For example, the connector 30 and/or the fastener 32 may be elongated along the axis A.

In the example shown in the figures, the washer 24, the connector 30, the tolerance compensator 22, and the fastener 32 are coaxial on the axis A. In the example shown in the figures, the washer 24 and the sensor bracket 20 may each include an aperture 34, 36, e.g., a circular aperture, centered on the axis A. The aperture 34 of the washer 24 and the aperture 36 of the sensor bracket 20 may be coaxial. The tolerance compensator 22 may include a bore 38 that is coaxial with the aperture 34 of the washer 24 and the aperture 36 of the sensor bracket 20. An aperture 40 of the base 16 may extend through a back side 42 of the base 16 and a front side 44 of the base 16. The aperture 40 of the base 16 may be coaxial with the aperture of the washer 24 and the aperture of the sensor bracket 20.

Figure 7:
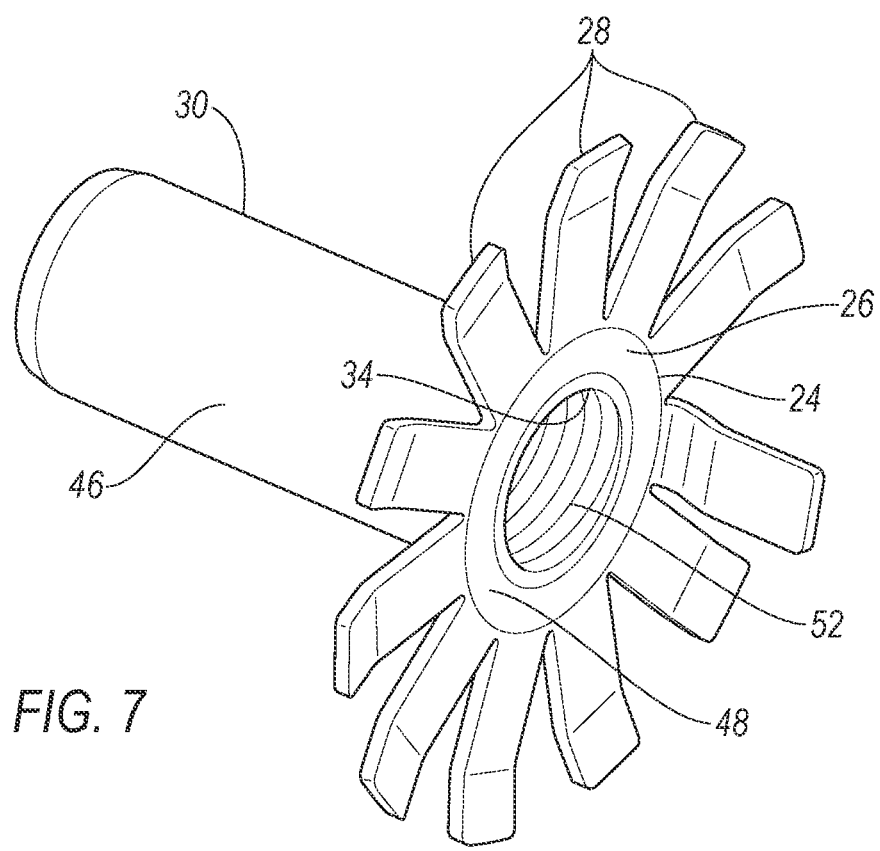
FIG. 7 is another example of a washer and a connector of the sensor assembly.

As set forth above, the washer 24 is fixed relative to the base 16, as shown in FIGS. 3-5. In other words, the washer 24 does not move along the axis A relative to the base 16 and does not rotate about the axis A relative to the base 16. As an example, the assembly 10 may include the connector 30 that connects the washer 24 to the base 16. In such examples, the washer 24 and the connector 30 may be separate components (as shown in the example washer 24 shown in FIG. 7) or the washer 24 and the connector 30 may be unitary (as shown in the example washer 24 and connector 30 in FIG. 8). In examples in which the washer 24 and the connector 30 are unitary, the washer 24 and the connector 30 are a uniform piece of material with no seams, joints, fasteners, or adhesives holding the together, i.e., formed together simultaneously as a single continuous unit, e.g., by machining from a unitary blank, molding, forging, casting, etc. In contrast, in examples in which the washer 24 and the connector 30 are not unitary, the washer 24 and the connector 30, are formed separately and subsequently assembled, by being pinched during the riveting process described below, by being welded together, by being adhered together, etc. As other examples, the washer 24 may be connected directly to the base 16, e.g., by welding, adhesive, bonding, etc. In such an example, the assembly 10 does not include a connector 30.

The connector 30 may be, for example, a rivet nut, as shown in the example shown in the figures. In such an example, the rivet nut extends through the aperture 40 of the base 16. The rivet nut is fixed to the base 16. Specifically, the rivet nut may be riveted to the base 16. The rivet nut includes a shaft 46 that may extend through the aperture 40 of the base 16, a radial flange 48 on one side of the base 16, and a bulb 50 on the other side of the base 16. In the assembled position, the bulb 50 may be on the back side 42 of the base 16 and the radial flange 48 may be on the front side 44 of the base 16. Specifically, in the assembled position, the bulb 50 and the radial flange 48 are larger than the aperture 40 of the base 16. In the example in FIG. 7 in which the connector 30 is unitary with the washer 24, the radial flange 48 of the connector 30 is unitary with the hub 26 of the washer 24.

The bulb 50 of the rivet nut may be formed by deforming the end of the rivet nut at the back side 42 of the base 16. Specifically, the shaft 46 of the rivet nut is sized to be inserted through the aperture 40 of the base 16 and the end of the shaft 46 extending outboard from the back side 42 of the base 16 is deformed, i.e., bucked, radially outwardly to a diameter larger than the aperture 40 of the base 16. After this process, in the assembled position, the bulb 50 of the rivet nut is larger than the aperture 40 of the base 16. This prevents the rivet nut from being removed from the aperture 40 in the assembled position. Specifically, the bulb 50 abuts the base 16 and prevents the rivet nut from being removed from the aperture 40 of the base 16. The bulb 50 pinches the base 16 between the bulb 50 and the radial flange 48 to prevent linear movement of the rivet nut relative to the base 16 along the axis A and prevents rotational movement of the rivet nut relative to the base 16 about the axis A.

With reference to FIGS. 3-5, in the example in which the assembly 10 includes the rivet nut, the rivet nut connects the washer 24 to the base 16. In the example shown in the figures, the washer 24 is between the rivet nut and the front side 44 of the base 16. Specifically, the hub 26 of the washer 24 is between the radial flange 48 and the base 16. In the assembled position, the radial flange 48 pinches the hub 26 of the washer 24 against the base 16 and prevents linear movement of the hub 26 relative to the base 16 along the axis A and prevents rotational movement of the hub 26 relative to the base 16 about the axis A.

In the example in which the connector 30 is the rivet nut, the rivet nut includes a bore 52 that receives the tolerance compensator 22. Specifically, the tolerance compensator 22 is adjustably coupled to the rivet nut in the bore 52. For example, the bore 52 may be threaded and the tolerance compensator 22 includes a shaft 54 that is threaded. The threads of the bore 52 and the shaft 54 are matching so that the tolerance compensator 22 may be threadedly engaged with the bore 52.

In examples in which the assembly 10 includes the rivet nut that connects the tolerance compensator 22 to the base 16, the rivet nut is positioned between the tolerance compensator 22 and the base 16. In such examples, the rivet nut and the tolerance compensator 22 are designed to releasably engage the tolerance compensator 22 to the rivet nut. Specifically, the rivet nut may allow for selective linear movement of the tolerance compensator 22 relative to the base 16 along the axis A. As an example shown in the figures and described above, the tolerance compensator 22 may be threadedly engaged with the connector 30. In such an example, the tolerance compensator 22 is rotated for linear adjustment of the tolerance compensator 22 relative to the connector 30. Specifically, as shown in the example in the figures, the connector 30 may include the bore 52 that is threaded and the tolerance compensator 22 may include a shaft 54 that is threaded.

As shown in FIGS. 2-5, the tolerance compensator 22 is between the base 16 and the sensor bracket 20. The tolerance compensator 22 is linearly adjustable relative to the base 16. Specifically, the position of the tolerance compensator 22 is adjusted relative to the base 16 to position the sensor 12 relative to the base 16. The tolerance compensator 22 may be adjusted to position the sensor 12 relative to the base 16 in a suitable position for calibration of the sensor 12 and/or may be adjusted to calibrate the sensor 12. The position of the tolerance compensator 22 may be adjusted relative to the base 16 before and/or after assembly 10 of the sensor bracket 20 and the sensor 12 to the tolerance compensator 22.

The tolerance compensator 22 is threadedly coupled to the base 16 in the assembled position. Specifically, the tolerance compensator 22 is threadedly coupled to a component intermediate to the tolerance compensator 22 and the base 16 or threadedly engaged directly with the base 16. As set forth above, the shaft 54 of the tolerance compensator 22 may be threaded to threadedly engage the bore 52 of the connector 30. In such an example, the tolerance compensator 22 may include a head 56 extending radially outward from the shaft 54. In the example shown in the figures, the head 56 is hexagonally-shaped to exert rotational force on the tolerance compensator 22 to adjust the position of the tolerance compensator 22 relative to the base 16.

The tolerance compensator 22 is releasably engaged with the sensor bracket 20 in the assembled position. Specifically, the tolerance compensator 22 couples the sensor bracket 20 to the base 16 and, at least in part, supports the sensor bracket 20 on the base 16. The sensor bracket 20 may be directly or indirectly engaged with the tolerance compensator 22. In the example shown in the figures, the sensor bracket 20 is directly engaged with the tolerance compensator 22, i.e., with no intermediate components therebetween. For example, in the example shown in the figures, the assembly 10 includes the fastener 32. The fastener 32 releasably engages the sensor bracket 20 to the tolerance compensator 22, e.g., by threaded engagement. Specifically, the fastener 32 may be disengaged with the tolerance compensator 22 to release the sensor bracket 20 from the tolerance compensator 22.

The fastener 32 may extend through the aperture 36 of the sensor bracket 20 and into the tolerance compensator 22. Specifically, the fastener 32 includes a shaft (not numbered) that may extends through the aperture 36 of the sensor bracket 20 to the tolerance compensator 22. In the example shown in the figures, the shaft of the fastener 32 is threaded, i.e., a threaded shaft, and the tolerance compensator 22 includes the bore 38 that is threaded, i.e., a threaded bore, to match the threads of the shaft of the fastener 32. In such an example, the fastener 32 threadedly engage the bore 38 of the tolerance compensator 22. The fastener 32 may include a head, as shown in the figures, that fixes the sensor bracket 20 to the tolerance compensator 22. The fastener 32 in the example shown in the figures is a bolt.

When engaged with the tolerance compensator 22, the sensor bracket 20 supports the sensor 12 on the base 16. The sensor 12 may be fixed to the sensor bracket 20. In other words, the sensor 12 and the sensor bracket 20 move together as a unit. The sensor 12 may be fixed to the sensor bracket 20 in any suitable fashion, e.g., fasteners, adhesive, etc.

As set forth above, the washer 24 includes the hub 26 and a plurality of tabs 28. The hub 26 is fixed relative to the front side 44 of the base 16, as set forth above. The washer 24 is supported by the base 16, i.e., the weight of the washer 24 is borne by the base 16. In one example, the hub 26 of the washer 24, the front side 44 of the base 16, and the radial flange 48 may be in parallel planes between the front side 44 and the radial flange 48.

As set forth above, the washer 24 includes the plurality of tabs 28 arranged circumferentially around the hub 26. Prior to moving one of the tabs 28 in the assembled position, the plurality of tabs 28 may extend radially relative to the hub 26. The tabs 28 may be connected directly to the hub 26 and may extend radially from the hub 26. The tabs 28 may extend radially relative to the central axis A.

As set forth above, one of the tabs 28 may be moveable into engagement with the tolerance compensator 22 in the assembled position, as shown in FIGS. 4 and 5. FIG. 3 shows the washer 24 prior to movement of the tab 28 to the assembled position. In the example shown in the figures, the tolerance compensator 22 includes the head 56 that has sides 58, e.g., the hexagonally-shaped head, and at least one of the tabs 28 is moveable into engagement with at least one of the sides 58 of the head 56. For example, the tab 28 is moveable to abut the side 58 of the head 56. This engagement prevents rotation of the tolerance compensator 22 relative to the base 16 thus locking the linear position of the tolerance compensator 22 relative to the base 16. As set forth above, this allows the tolerance compensator 22 to be locked in place relative to the base 16 so that the sensor bracket 20 may be removed from the tolerance compensator 22 and the base 16, e.g., for vehicle service. In the example shown in the figures, the sides of the head of the tolerance compensator 22 are flat, i.e., planar.

The tab 28 that is moveable into engagement with the tolerance compensator 22 in the assembled position may also be moveable into engagement with the sensor bracket 20 in the assembled position. With reference to FIG. 4, the sensor bracket 20 includes an edge 60 and the tab 28 that is moveable to engage the tolerance compensator 22 also engages the edge 60.

The tabs 28 are moveable independently of each other. In other words, one of the tabs 28 may be moved relative to the hub 26 and the other tabs 28 may be stationary relative to the hub 26. Any one of the tabs 28 may be moveable into engagement with any of the sides 58 of the head 56 depending on the rotational position of the washer 24 and the tolerance compensator 22 relative to the axis A.

As set forth above, one of the tabs 28 is moveable into engagement with the tolerance compensator 22. Specifically, the tabs 28 may be bendable relative to the hub 26. In such an example, the tab 28 is plastically deformed when moved into engagement with the tolerance compensator 22. For example, the tab 28 that is moved into engagement with the tolerance compensator 22 is transverse to the hub 26 in the assembled position. The tab 28 may be bent angularly relative to the hub 26 into engagement with the tolerance compensator 22. The tabs 28 that is moved into engagement with the tolerance compensator 22 in the assembled position is elongated transverse to the hub 26 in the assembled position and the other ones of the tabs 28 are elongated radially from the hub 26 in the assembled position.

A method 800 of installing the sensor bracket 20 to the base 16 is shown in FIG. 8. The method 800 locks the position of the tolerance compensator 22 relative to the base 16 to allow the sensor bracket 20 to be removed and re-assembled in the same position relative to the base 16. Specifically, the sensor bracket 20 may be removed, for example during vehicle service, and re-assembled in the same position relative to the base 16 to avoid recalibrating the sensor 12.

With reference to block 810, the method 800 includes fixing the washer 24 relative to the base 16. In other words, the washer 24 is fixed relative to the base 16 so that the washer 24 does rotate about the axis A and does not move linearly along the axis A. The method may include fixing the washer 24 directly to the base 16. For example, in the example shown in FIGS. 2-6, block 810 may include includes inserting the connector 30 into the aperture in the hub 26 of the washer 24 and into the aperture of the base 16 and deforming the connector 30 on the back side of the base 16. Specifically, in examples in which the connector 30 is the rivet nut, block 810 includes inserting the rivet nut into the aperture in the hub 26 of the washer 24 and into the aperture of the base 16 and deforming the rivet nut on the back side of the base 16.

With reference to block 815, the method 800 includes adjustably engaging the tolerance compensator 22 with the base 16. For example, block 815 may include threadedly coupling tolerance compensator 22 to the base 16. Specifically, threadedly coupling the tolerance compensator 22 to the base 16 includes threadedly engaging threads of the tolerance compensator 22 with threads in the bore of the connector 30. In the example in which the connector 30 is the rivet nut, block 815 includes threadedly engaging threads of the tolerance compensator 22 with threads in the bore of the rivet nut.

With reference to block 820, the method 800 includes releasably engaging the sensor bracket 20 to the tolerance compensator 22. In the example shown in the figures, block 820 includes releasably engaging the sensor bracket 20 to the tolerance compensator 22 with the fastener 32. Specifically, the fastener 32 may be a threaded fastener 32 and block 820 may include inserting the threaded fastener 32 through an aperture of the sensor bracket 20 and threadedly engaging the bore of the tolerance compensator 22 that is threaded. In the example shown in the figures, the fastener 32 engages the bore of the tolerance compensator 22 such that the fastener 32 is free of direct engagement with the base 16.

In blocks 810-820, the method 800 may include coaxially aligning the aperture in the hub 26, the aperture of the base 16, and the aperture of the sensor bracket 20. Specifically, the method 800 includes aligning the washer 24, the connector 30, and the tolerance compensator 22 on the axis A.

With reference to block 825, the method 800 includes calibrating the sensor 12 that is fixed to the sensor bracket 20. For example, the sensor 12 may be operated and measurements of the sensor 12 may be compared to expected measurements. As one example based on this comparison, the sensor 12 may be adjusted to move the measurements of the sensor 12 to the expected measurement. As another example, the position of the tolerance compensator 22 may be adjusted to move the measurements of the sensor 12 to the expected measurement.

With reference to block 830, after adjustably engaging the tolerance compensator 22 with the base 16, the method 800 includes moving the tab 28 of the washer 24 into engagement with the tolerance compensator 22. Specifically, block 830 may include bending one of the tabs 28 into engagement with one of the sides of the tolerance compensator 22. Specifically, in the example shown in the figures, after threadedly coupling the tolerance compensator 22 to the base 16, the method includes moving one of the tabs 28 into engagement with the tolerance compensator 22. Block 830 may also include moving the tab 28 of the washer 24 into engagement with the sensor bracket 20, e.g., the edge of the sensor bracket 20. Block 830 is performed after block 810 and 815. Block 830 may be performed after block 820. In other words, the sensor bracket 20 may be assembled to the tolerance compensator 22 before the tab 28 is moved into engagement with the tolerance compensator 22. Block 830 may be performed after block 825, i.e., after the sensor 12 is calibrated, the tab 28 is moved into engagement with the tolerance compensator 22 to prevent adjustment of the position of the sensor 12 relative to the base 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
   a base;
   a sensor bracket;
   a tolerance compensator between the base and the sensor bracket, the tolerance compensator being threadedly coupled to the base and releasably engaged with the sensor bracket in an assembled position; and
   a washer including a hub fixed relative to the base and a plurality of tabs arranged circumferentially around the hub and extending radially relative to the hub;
   one of the tabs being moveable into engagement with the tolerance compensator and the sensor bracket in the assembled position.

2. The assembly of claim 1, wherein the washer includes an aperture and the base includes an aperture that is coaxial with the aperture of the washer.

3. The assembly of claim 2, further comprising a connector coaxial with the aperture of the washer, the connector being fixed relative to the base and threadedly engaged with the tolerance compensator.

4. The assembly of claim 3, wherein the sensor bracket includes an aperture coaxial with the aperture of the washer and the tolerance compensator includes a bore coaxial with the aperture of the washer, and further comprising a fastener extending through the aperture of the sensor bracket and into the bore of the tolerance compensator.

5. The assembly of claim 2, further comprising a rivet nut extending through the aperture of the washer and the aperture of the base, the rivet nut being riveted to the base and threadedly engaged with the tolerance compensator.

6. The assembly of claim 5, wherein the base has a front side and a back side, the aperture extending through the front side and the back side, the rivet nut includes a bulb on the back side and a radial flange on the front side, the washer being pinched between the radial flange and the front side.

7. The assembly of claim 6, wherein the front side, the hub of the washer, and the radial flange are in parallel planes between the front side and the radial flange.

8. The assembly of claim 1, further comprising a connector being fixed relative to the base and threadedly engaged with the tolerance compensator.

9. The assembly of claim 8, wherein the washer is between the base and the connector.

10. The assembly of claim 1, wherein the sensor bracket includes an aperture and the tolerance compensator includes a bore coaxial with the aperture of the sensor bracket, and further comprising a fastener extending through the aperture of the sensor bracket and into the bore of the tolerance compensator.

11. The assembly of claim 10, wherein the fastener is threadedly engaged with the bore of the tolerance compensator.

12. The assembly of claim 1, wherein the one of the tabs that is moveable into engagement with the tolerance compensator in the assembled position is moveable independently of the other ones of the tabs.

13. The assembly of claim 1, wherein the one of the tabs that is moveable into engagement with the tolerance compensator in the assembled position is elongated transverse to the hub in the assembled position and the other ones of the tabs are elongated radially from the hub in the assembled position.

14. A method of installing a sensor bracket to a base, the method comprising:
  threadedly coupling a tolerance compensator to the base;
  releasably engaging the sensor bracket to the tolerance compensator;
  fixing a hub of a washer relative to the base, the washer including a plurality of tabs arranged circumferentially around the hub and extending radially relative to the hub; and
  after threadedly coupling the tolerance compensator to the base, moving one of the tabs into engagement with the tolerance compensator and the sensor bracket.

15. The method of claim 14, wherein releasably engaging the sensor bracket to the tolerance compensator includes inserting a threaded fastener through an aperture of the sensor bracket and threadedly engaging a threaded bore of the tolerance compensator.

16. The method of claim 15, wherein the fastener engages the bore of the tolerance compensator such that the fastener is free of direct engagement with the base.

17. The method of claim 14, further comprising coaxially aligning an aperture in the hub, an aperture of the base, and an aperture of the sensor bracket.

18. The method of claim 14, further comprising inserting a rivet nut into an aperture in the hub of the washer and into an aperture of the base, deforming the rivet nut on a back side of the base, wherein threadedly coupling the tolerance compensator to the base includes threadedly engaging threads of the tolerance compensator with threads of the rivet nut.

* * * * *